US006961427B1

(12) United States Patent
Qiu et al.

(10) Patent No.: US 6,961,427 B1
(45) Date of Patent: Nov. 1, 2005

(54) METHODS AND APPARATUS FOR KEYSTREAM GENERATION

(75) Inventors: Xin Qiu, San Diego, CA (US); Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 711 days.

(21) Appl. No.: 09/717,761

(22) Filed: Nov. 21, 2000

Related U.S. Application Data

(60) Provisional application No. 60/167,185, filed on Nov. 23, 1999.

(51) Int. Cl.[7] .................................................. H04L 9/04

(52) U.S. Cl. ............................ 380/44; 380/46; 380/47; 380/262; 380/265; 380/268

(58) Field of Search .............................. 380/44, 46, 47, 380/262, 265, 268

(56) References Cited

U.S. PATENT DOCUMENTS 4,860,353 A 8/1989 Brown
5,515,307 A * 5/1996 Aiello et al. ................ 708/254
5,727,063 A * 3/1998 Aiello et al. .................. 380/46
6,763,363 B1 * 7/2004 Driscoll ...................... 708/252
2002/0006195 A1 * 1/2002 Venkatesan et al. .......... 380/44
2002/0015493 A1 * 2/2002 Rose ........................... 380/44
2003/0206634 A1 * 11/2003 Rose .......................... 380/265

FOREIGN PATENT DOCUMENTS

EP 0913964 A2 * 6/1999 ............. H04L 9/26

OTHER PUBLICATIONS

Schneier, B "Applied Cryptography, Protocols, Algorithms and Source Code in C", 1996, John Wiley & Son, Inc., Second Edition, pp. 166-167, 175, 283, 254-255, 369-421.*
Stoklosa et al., "Integrity of data: FSR-Hash", Sep. 1995, Proceedings of the 12th International Conference on Systems Science, vol. 3, Wroclaw, Poland, 12-15.*

* cited by examiner

*Primary Examiner*—Gregory Morse
*Assistant Examiner*—Tongoc Tran
(74) *Attorney, Agent, or Firm*—Robert P. Marley

(57) ABSTRACT

Methods and apparatus for the generation of a cryptographic one way function (a key or keystream generator) for use in encrypting or decrypting binary data. A non-linear key or keystream generation algorithm using multiple feedback shift registers is provided. The feedback shift registers may be constructed utilizing an advanced mathematical construct called an extended Galois Field GF($2^m$). The key or keystream is generated as a non-linear function of the outputs of the multiple feedback shift registers, which may be a combination of static feedback shift registers and dynamic feedback shift registers. Dense primitive polynomials with many coefficients may be used to produce a cryptographically robust keystream for use as an encryption or decryption key.

46 Claims, 8 Drawing Sheets

DATA BITS FROM PREDETERMINED REGISTER STAGES
10
DATA BITS FROM OTHER PREDETERMINED REGISTER STAGES
12
FIRST RANDOMIZATION STAGE 20
SECOND RANDOMIZATION STAGE 30
FINAL RANDOMIZATION STAGE 40
KEYSTREAM REGISTER 60
IN CLK OUT
KEYSTREAM 100
CLOCK/2
PREKEYSTREAM REGISTER
IN 50 OUT
CLK
PREKEYSTREAM 45
CLOCK
POLYNOMIAL CODE SIGNAL TO SHIFT REGISTERS 90
DECODING LOGIC UNIT 80
SELECT CHAIN BUFFER 70
CLOCK/2

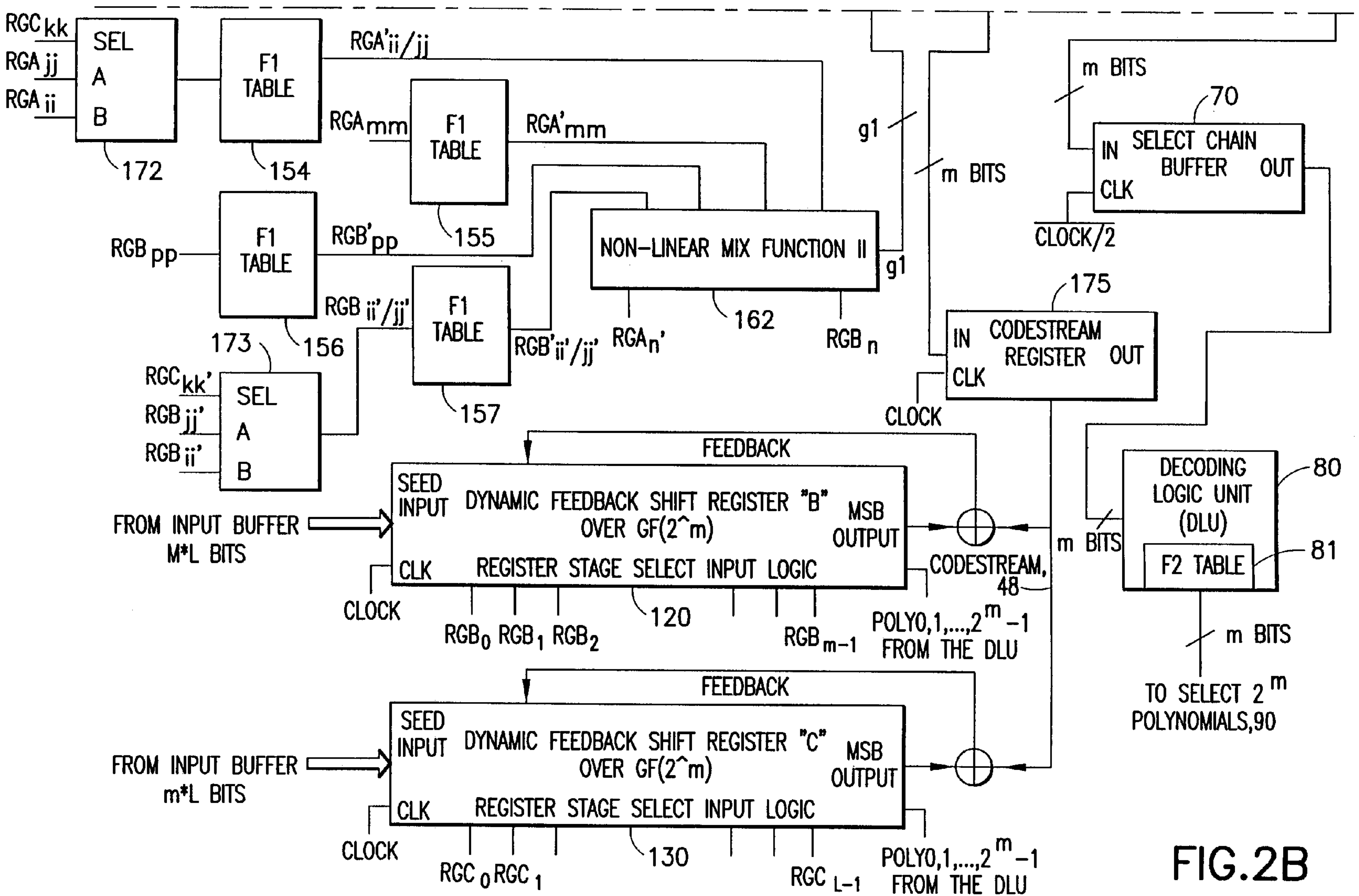
RGC kk
RGA jj
RGA ii
SEL
A
B
172
F1 TABLE
154
RGA'ii/jj
RGA mm
F1 TABLE
155
RGA'mm
RGB pp
F1 TABLE
156
RGB'pp
RGB ii'/jj'
F1 TABLE
157
RGB'ii'/jj'
173
RGC kk'
RGB jj'
RGB ii'
NON-LINEAR MIX FUNCTION II
162
RGA n'
RGB n
g1
m BITS
SELECT CHAIN BUFFER
IN
OUT
CLK
CLOCK/2
70
CODESTREAM REGISTER
175
CLOCK
FEEDBACK
SEED INPUT
DYNAMIC FEEDBACK SHIFT REGISTER "B" OVER GF(2^m)
MSB OUTPUT
REGISTER STAGE SELECT INPUT LOGIC
120
FROM INPUT BUFFER M*L BITS
RGB0 RGB1 RGB2
RGB m-1
CODESTREAM, 48
POLY0,1,...,2^m -1 FROM THE DLU
DECODING LOGIC UNIT (DLU)
80
F2 TABLE
81
TO SELECT 2^m POLYNOMIALS,90
DYNAMIC FEEDBACK SHIFT REGISTER "C" OVER GF(2^m)
130
FROM INPUT BUFFER m*L BITS
RGC 0 RGC 1
RGC L-1
FIG.2B

METHODS AND APPARATUS FOR KEYSTREAM GENERATION

This application claims the benefit of U.S. provisional patent application No. 60/167,185 filed on Nov. 23, 1999.

BACKGROUND OF THE INVENTION

The present invention relates generally to the fields of security and cryptography. Methods and apparatus for the generation of a random cryptographic one way function (i.e. a keystream) for use in encrypting or decrypting binary data are provided. Binary data may comprise digitized video or audio, as well as Internet Protocol or other pure data services. Although the invention has particular applicability in controlling access to premium services in cable and satellite television systems, it is also applicable to the protection of other information which is communicated in electronic form.

More particularly, the present invention provides a non-linear keystream generation algorithm using multiple feedback shift registers. The feedback shift registers may be constructed utilizing an advanced mathematical construct called an extended Galois Field $GF(2^m)$. The keystream is generated as a non-linear function of the outputs of the multiple feedback shift registers, which may be a combination of static feedback shift registers and dynamic feedback shift registers. Dense primitive polynomials with many coefficients may be used to produce a cryptographically robust keystream for use as an encryption or decryption key.

One way that binary data may be scrambled (encrypted) is by processing the binary data with a keystream (cryptographic key) to produce ciphertext (encrypted data). Keystreams are based on a sequence of bits that can be generated by pseudorandom sequences. The ciphertext can then be decrypted using an identical keystream. Data content owners want technology used in copy protection key derivation to be unique and difficult to duplicate. To achieve this end, binary data can be processed through a hash function by using that data as the input to a cryptographic One Way Hash Function, and by using the output of that Function as an encryption key for other binary data.

Commonly assigned U.S. Pat. No. 4,860,353 describes a dynamic feedback arrangement scrambling technique (DFAST) keystream generator. DFAST utilizes a dynamic feedback shift register, the structure of which is varied by a polynomial code signal. The polynomial code signal is varied in accordance with the content of data bits shifted from a predetermined register stage of the feedback shift register.

It would be advantageous to provide for generating a keystream having enhanced cryptographic and ease-of-implementation features as compared to those provided by DFAST and other prior art keystream generators.

It would be further advantageous to provide for keystream generation utilizing multiple feedback shift registers constructed using an extended Galois Field GF $(2^m)$. Extended Galois Field mathematics is well-suited to implementation in software systems. It would be still further advatageous to provide for keystream generation where the structure of the feedback shift registers are also varied by a polynomial code signal. It would be even further advantageous to provide for keystream generation using several randomization (e.g., permutation) stages to combine data bits from predetermined register stages of the feedback shift registers in a non-linear manner.

The present invention provides the foregoing and other advantages. More specifically, the present invention provides for an extension and improvement of the DFAST technology described in commonly assigned U.S. Pat. No. 4,860,353. An improved dynamic feedback arrangement scrambling technique in accordance with the invention (sometimes designated herein as "DFAST2"), provides a keystream with enhanced cryptographic and ease-of-implementation features as compared to DFAST. The present invention is suitable for use with a cable television system or hosts with point of deployment (POD) capability. The present invention is particulary suited for use with OpenCable™ set top boxes and PODs developed by Cable Televison Laboratories, Inc. (CableLabs™) of Colorado, USA, and is incorporated into the January 2000 POD Copy Protection Standard.

SUMMARY OF THE INVENTION

The present invention provides methods and apparatus for the generation of a cryptographic one way function that produces an output that appears random for use in encrypting or decrypting binary data. More particularly, the present invention provides a non-linear key generation algorithm using multiple feedback shift registers. A keystream is typically a long series of randomized bits used to encrypt or decrypt a stream of data using the exclusive OR operation. A keystream generator is the source of these bits, and the first set of bits output from this keystream generator can be used as an actual encryption key of determinate size. The term "key" can thus mean a fixed set of bits (e.g. 56 bits) output from a keystream generator. The feedback shift registers may be constructed utilizing an advanced mathematical construct called an extended Galois Field $GF(2^m)$. The key is generated as a non-linear function of the outputs of the multiple feedback shift registers, which may be a combination of static feedback shift registers and dynamic feedback shift registers. Dense primitive polynomials with many coefficients may be used to produce a cryptographically robust key for use as an encryption or decryption key.

In an illustrative embodiment of the invention, a key is generated using multiple feedback shift registers. Each feedback shift register has input, intermediate, and output stages through which data bits are shifted serially in response to a clock signal. Data bits from predetermined register stages of multiple feedback shift registers are provided to a first randomization stage. The output of the first randomization stage is provided to a second randomization stage. The output of the second randomization stage and data bits from other predetermined register stages of the feedback shift registers are provided to at least one additional randomization stage. The data bits are permutated at each randomization stage and the final randomization stage output provides the keystream. The last 56 bits of keystream may be used as the final key.

In a preferred embodiment, a third randomization stage may be the final randomization stage.

The structure of at least one of the feedback shift registers may be varied in response to a polynomial code signal generated by a polynomial code signal generator. In addition, the polynomial code used to generate the polynomial code signal may be varied.

The feedback shift registers may comprise a plurality of dynamic feedback shift registers and at least one static feedback shift register.

In a preferred embodiment, the feedback shift registers may comprise a first dynamic feedback shift register, a second dynamic feedback shift register, and a static feedback shift register. Seed data may be input into an input buffer. A first portion of the seed data from the input buffer may be provided to the first dynamic feedback shift register and a second portion of the seed data from the input buffer may be provided to the second dynamic feedback shift register. A third portion of the seed data from the input buffer may be provided to the static feedback shift register.

The data bits of the dynamic feedback shift registers may be shifted serially from each register stage in response to a clock signal. A number of finite field adders may be arranged between predetermined pairs of the register stages of the dynamic feedback shift registers, such that one of the inputs to each adder is provided from the preceding register stage and the other input of each adder is fed back from the output terminal of the output stage via a finite field multiplier.

The first randomization stage may comprise a randomization table (e.g., a permutation table) for permuting data bits from predetermined register stages. The second randomization stage may comprise a non-linear mixing function to combine the output of the second randomization stage and data bits from other predetermined register stages of the feedback shift registers. The third randomization stage may comprise multiple non-linear S-Boxes. The S-Boxes may be 8*8 S-Boxes. The third randomization stage may comprise 256 non-linear 8*8 S-Boxes.

In a preferred embodiment, the feedback shift registers may be constructed using an extended Galois field ($GF(2^m)$). For example, the extended Galois field (GF(2^8)) may be used. The polynomials used for the feedback shift registers may be primitive and irreducible to assure maximum length output sequences.

In an alternate embodiment, the first randomization stage may comprise multiple randomization tables for permuting data bits from predetermined register stages. For example, eight randomization tables may be provided in the first randomization stage. The data bits from the feedback shift registers may be multiplexed prior to input into the first randomization stage.

In a further embodiment, the output from the third randomization stage may be provided to a pre-keystream register. Alternate bits of the output from said pre- keystream register may be provided to a select chain buffer. The output from the select chain buffer may be provided to a decoding logic unit, which decoding logic unit decodes a particular polynomial for use in generating a polynomial code signal, said polynomial code signal being provided to at least one of the feedback shift registers. The remaining bits of the output from said pre-keystream register may be provided to a keystream register. The output of the keystream register provides the keystream. The third randomization stage may comprise multiple non-linear S- Boxes.

Certain output of the S-Boxes may be provided to a codestream register. This output may be clocked through the codestream register and added to data bits shifted from at least one of the feedback shift registers via a non-binary adder to produce feedback data bits. The feedback data bits may be provided to the input stage and predetermined intermediate stages of at least one of the feedback shift registers.

Use of a 192 bit shared seed input is suggested, but other input key lengths can also be used. Use of a 192 bit input will generate a 56 bit key from the output keystream. The 192 bit input may be derived from a 128 bit input by duplicating half the bits.

The use of Galois Field $2^8$ operations is well- suited for implementation on CPUs that use 8, 16, or 32 bit instruction widths. Although the invention is described for implementation in software, it can easily be adapted for implementation in hardware.

DETAILED DESCRIPTION OF THE INVENTION

The present invention provides methods and apparatus for key generation using multiple feedback shift registers. The feedback shift registers may be constructed utilizing an advanced mathematical construct called an extended Galois Field $GF(2^m)$. The key is generated as a non-linear function of the outputs of the multiple feedback shift registers, which may be a combination of static feedback shift registers and dynamic feedback shift registers. Dense primitive polynomials with many coefficients may be used to produce a cryptographically robust keystream for use as an encryption or decryption key.

The keystream may be pseudorandomly generated from a shared seed key, with the intent that the keystream appears random to a computationally bounded adversary. The shared seed key value may be derived, e.g., from a host authentication and key exchange process. Use of a 192 bit shared seed input is suggested, but other input key lengths can also be used. Use of a 192 bit input will generate a 56 bit keystream. The 192 bit input may be derived from a 128 bit input by duplicating half the bits.

Figure 1:
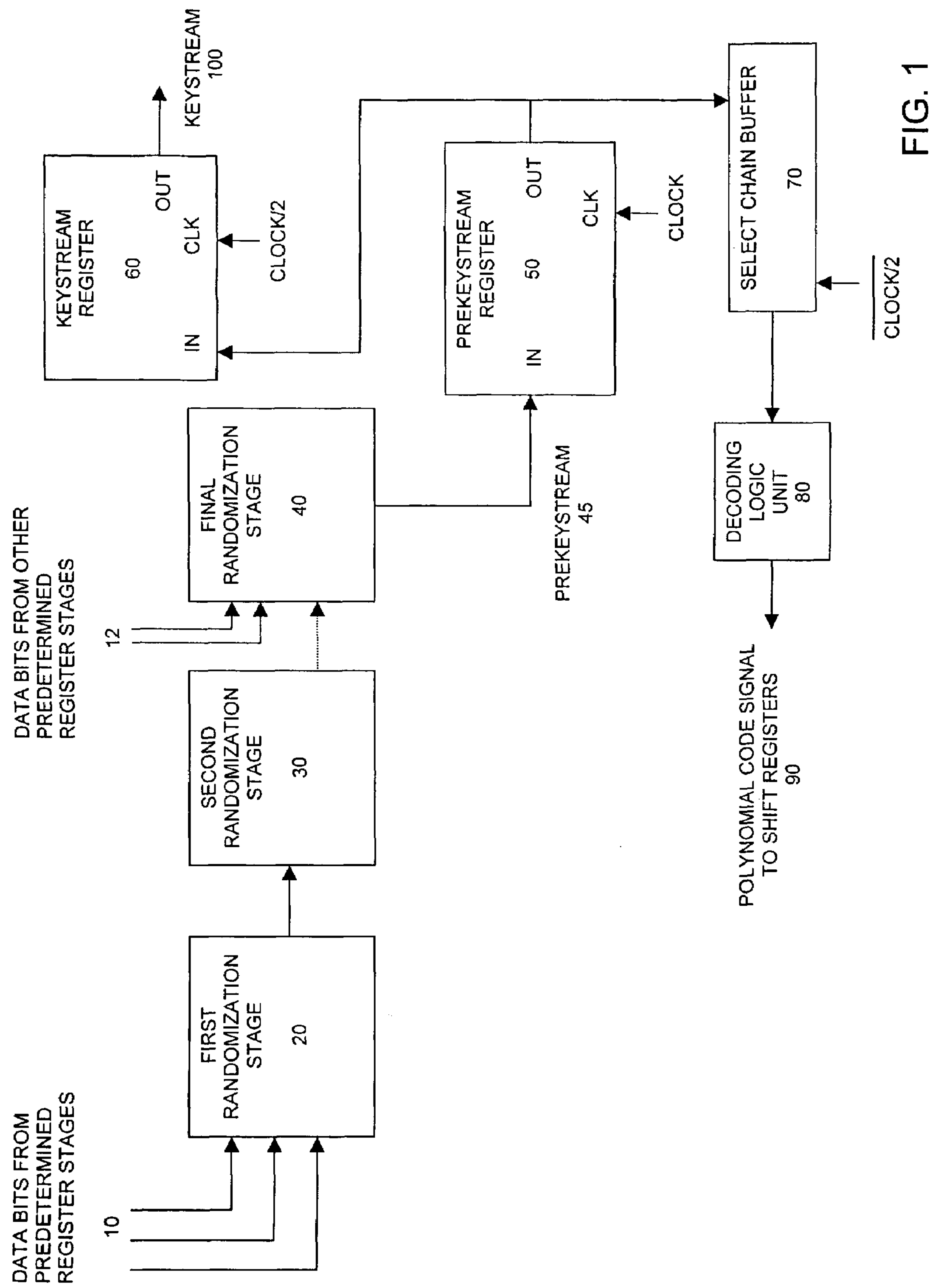
FIG. 1 shows a block diagram representation of the present invention.

In an illustrative embodiment of the invention as shown in FIG. 1, a keystream 100 is generated using multiple feedback shift registers. Each feedback shift register has input, intermediate, and output stages through which data bits are shifted serially in response to a clock signal. Data bits 10 from predetermined register stages of multiple feedback shift registers are provided to a first randomization stage 20. The output of the first randomization stage 20 is provided to a second randomization stage 30. The output of the second randomization stage 30 and data bits 12 from other predetermined register stages of the feedback shift registers are provided to at least one additional randomization stage. The data bits are permutated at each randomization stage and the output of a final randomization stage 40 provides the keystream 100.

In FIG. 1, three randomization stages 20, 30, and 40 are shown, with the third randomization stage being the final randomization stage 40. However, those skilled in the art will appreciate that any number of randomization stages may be provided, depending on the implementation and the cryptographic integrity of the keystream 100 desired.

The structure of at least one of the feedback shift registers may be varied in response to a polynomial code signal 90 generated by a polynomial code signal generator (e.g., decoding logic unit 80). In addition, the polynomial code used to generate the polynomial code signal 90 may be varied.

The feedback shift registers (FSR) may comprise a plurality of dynamic feedback shift registers (DFSR) and at least one static feedback shift register (SFSR). The two DFSRs may be arranged in parallel. The keystream 100 is generated as a nonlinear function of the outputs of both the SFSR and the DFSRs. The DSFRs are dynamic shift registers whose structure is varied by the polynomial code signal 90. The polynomial code signal 90 may itself be varied in accordance with data bits shifted from a predetermined register stage. It is substantially more difficult to duplicate the keystream 100 if the polynomial code varies. The bits that cause the polynomial code 90 to vary are preferably not included in the keystream 100.

Figures 2, 2A:
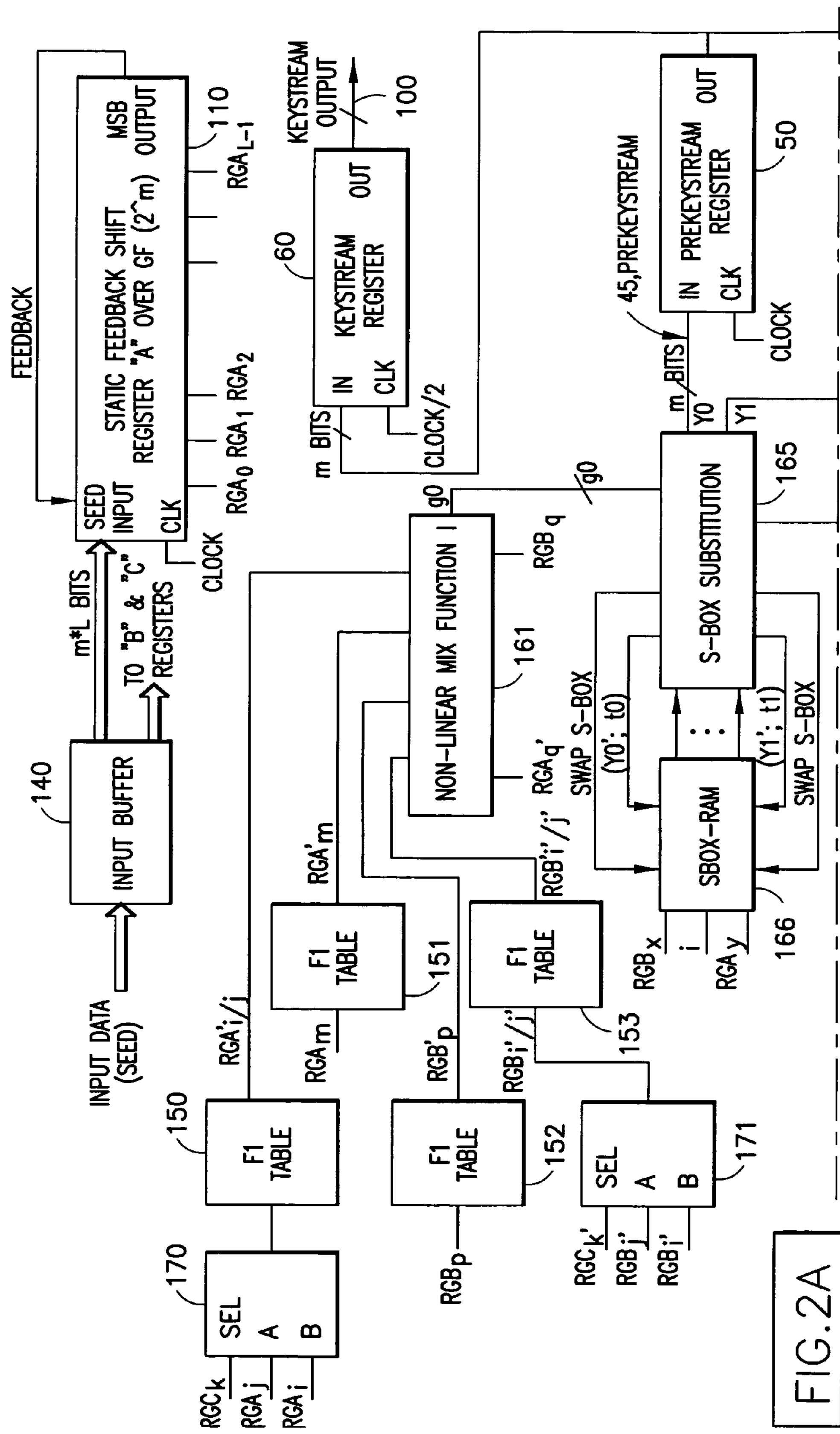
FIG. 2 shows an illustrative embodiment of the present invention.

In a preferred embodiment as shown in FIG. 2, the feedback shift registers may comprise a static feedback shift register A (generally designated 110), a first dynamic feedback shift register B (generally designated 120), and a second dynamic feedback shift register C (generally designated 130). Seed data may be input into an input buffer 140. The contents of the input buffer 140 may be loaded in parallel into the shift registers 110, 120, and 130 to initialize keystream generation. A first portion of the seed data from the input buffer 140 may be provided to the first dynamic feedback shift register B and a second portion of the seed data from the input buffer may be provided to the second dynamic feedback shift register C. A third portion of the seed data from the input buffer may be provided to the static feedback shift register A.

In the embodiment shown in FIG. 2, the feedback shift registers 110, 120, and 130 (registers A, B, and C respectively) may be constructed using an extended Galois field ($GF(2^m)$). As well known in the art, a Galois field is a mathematical field extension obtained by considering the coefficients and roots of a given polynomial. The polynomials used for the feedback shift registers in the present invention may be primitive and irreducible. Each such shift register would generate a sequence with the maximal length max_length=2^(m*L)−1 (where L is the number of shift register stages).

In the Figures, RGA denotes output from a stage of register A (110), RGB denotes output from a stage of register B (120), and RGC denotes output from a stage of register C (130). For example, FIG. 2 shows register A having output from L register stages ($RGA_0$, $RGA_1$, $RGA_2$, . . . $RGA_{L-1}$).

The data bits of the feedback shift registers 110, 120, and 130 may be shifted serially from each register stage in response to a clock signal. A number of finite field adders may be arranged between predetermined pairs of the register stages of the feedback shift registers 110, 120, and 130, such that one of the inputs to each adder is provided from the preceding register stage and the other input of each adder is fed back from the output terminal of the output stage via a finite field multiplier. An example of the structure of each feedback shift register 110, 120, and 130 of FIG. 2 is described in detail below in connection with FIGS. 4, 5, and 6. It is noted that the invention may utilize three or more stages of non-linear functions to combine data bits shifted from predetermined register stages of the feedback shift registers.

The first randomization stage (e.g., first randomization stage 20 of FIG. 1) may comprise one or more randomization tables (e.g., "F1 tables" 150–157) for permuting data bits from predetermined register stages. In the example shown in FIG. 2, eight F1 tables 150-157 are used. The eight F1 tables are shown for purposes of example only, and those skilled in the art will appreciate that the invention can be implemented using any number of F1 tables (or similar non-linear permutation functions) in the first randomization stage. The F1 tables 150–157 may be fixed substitution tables used to map data bits shifted from various feedback shift registers to a different value. The inputs to each F1 table may be separated by at least one exclusive-or gate in their source feedback shift register structure.

The data bits from selected register stages of the feedback shift registers may be multiplexed (e.g., at multiplexers 170–173) prior to input into the F1 tables 150–157. Selection by the multiplexers 170–173 between data bits shifted from different predetermined register stages is controlled in response to a data bit shifted from a different predetermined register stage. For example, in FIG. 2, two output bits ($RGA_j$ and $RGA_i$) are shifted directly from different stages of register A to multiplexer 170. One of $RGA_j$ and $RGA_i$ is selected by multiplexer 170 in response to a data bit shifted from register C ($RGC_k$). Similar operations take place at multiplexers 171, 172, and 173. The output of multiplexers 170, 171, 172, and 173 is provided to F1 tables 150, 153, 154, and 157 respectively.

F1 table 151 receives input directly from a stage of register A ($RGA_m$). F1 table 152 receives input directly from a stage of register B ($RGB_p$). F1 table 155 receives input directly from a stage of register A ($RGA_{mm}$). F1 table 156 receives input directly from a stage of register B ($RGB_{pp}$).

The second randomization stage (e.g., second randomization stage 30 of FIG. 1) may comprise one or more non-linear mixing functions (e.g., 161, 162) to combine the output of the second randomization stage and data bits from other predetermined register stages of the feedback shift registers. In the example shown in FIG. 2, two non-linear mixing functions 161, 162 are used for purposes of example only. Those skilled in the art will appreciate that the invention can be implemented using any number of non-linear mixing functions (or similar non-linear permutation functions) in the second randomization stage.

The non-linear logic used by the non-linear mixing functions 161, 162 combines at least 4 tap positions, some of which are from the F1 table outputs, and several others directly from predetermined FSR stages. For example, FIG. 2 shows non-linear mixing function 161 as having input $RGB'_{i'/j'}$ from F1 table 153, input $RGB'_p$ from F1 table 152, input $RGA'_m$ from F1 table 151, and input $RGA'_{i/j}$ from F1 table 150, as well as inputs $RGA_q$, and $RGB_q$ directly from a stage of register A and a stage of register B respectively. In such an instance, the non-linear mix function may be g0= $RGA'_{i/j}RGB'_{i'/j'} \oplus RGA_q, RGB'_p \oplus RGA'_m RGB_q$. In this equation, represents the field element multiplication operation, and represents the field element addition operation (bit-wise XOR).

Non-linear mix function 162 is shown as having input $RGA'_{ii/jj}$ from F1 table 154, input $RGA'_{mm}$ from F1 table 155, input $RGB'_{pp}$ from F1 table 156 and input $RGB'_{ii'/jj'}$ from F1 table 157, as well as inputs $RGA_n$, and $RGB_n$ directly from a stage of register A and a stage of register B respectively. These inputs may be combined at the non-linear mix function 162 by function g1= $RGA'_{ii/jj}RGB'_{ii'/jj'} \oplus RGA_n, RGB'_{pp} \oplus RGA'_{mm}RGB_n$.

The third randomization stage (e.g., Final Randomization Stage 40 of FIG. 1) may comprise multiple non-linear substitution boxes (S-Boxes) 165. The S-Boxes 165 may be 8*8 S-Boxes.

In a preferred embodiment, the third randomization stage may comprise 256 non-linear dynamic 8*8 S-boxes 165

(e.g., $S_0, S_1, S_2, \ldots S_{255}$). A loop counter is provided to count n (number of FSR cycles) to ensure that every element in the dynamic S-Box 165 changes during operation. At least one predetermined stage of two of the extended Galois field shift register structures directly provides a randomized byte of S-Box address signals (shown as $RGB_x$ and $RGA_y$ input into S-Box RAM 166). The already highly randomized outputs (g0 and g1) from the non-linear mixing functions 161, 162 are added to the nth element of the S-Box 165, and to the element of S-Box 165 indexed by $RGB_x/RGA_y$ directly from the FSR structures. This generates highly randomized outputs Y0' and Y1'. The S-box elements indexed by n and Y0'/Y1' are then swapped so that every element in $(S_0, S_1, \ldots, S_{255})$ is affected during the first 256 cycles of FSR shifting operations.

In a further embodiment, the output (pre-keystream 45) from the third randomization stage (e.g., S-Box 165) may be provided to a pre-keystream register 50. Alternate bits of the output from said pre-keystream register 50 may be provided to a select chain buffer 70. The output from the select chain buffer 70 may be provided to a decoding logic unit 80, which decoding logic unit 80 decodes a particular polynomial for use in generating a polynomial code signal 90, said polynomial code signal 90 being provided to at least one of the dynamic feedback shift registers 120, 130. The remaining bits of the output from said pre- keystream register 50 may be provided to a keystream register 60. The output of the keystream register 60 provides the keystream 100.

The pre-keystream 45 may be clocked into the pre-keystream register 50 at the system clock rate. Alternate bytes of the pre-keystream 45 may be clocked at one-half the system clock rate into the select chain buffer 70 by an inverted CLOCK/2 signal. The remaining bytes of the pre-keystream 45 may be clocked at one- half the system clock rate into the keystream register 60 by an uninverted CLOCK/2 signal. This avoids placing contiguous bytes of the pre-keystream 45 into the keystream 100. This also assures that keystream bytes are not used as signals to control selection of the polynomial code signals 90. The pre-keystream register 50 is the final output creation stage and produces 8 bits of output data per clock cycle of uninverted CLOCK/2.

The decoding logic unit 80 uses the bits stored in the select chain buffer 70 to decode a particular polynomial, setting a signal corresponding to a particular polynomial true while setting all other polynomial signals false.

The decoding logic unit 80 may use a fixed byte substitution table (F2 table 81) to provide up to $2^m$ different polynomial code signals 90. The F2 table 81 may be a fixed substitution table similar to the F1 tables 150–157.

Certain output of the S-Boxes 165 may be provided to a codestream register 175. This output may be clocked through the codestream register 175 (codestream 48) and added to data bits shifted from at least one of the feedback shift registers 120, 130 via a non-binary adder to produce feedback data bits. The feedback data bits may be provided to the input stage and predetermined intermediate stages of at least one of the feedback shift registers 120, 130. The codestream 48 is distinct from the pre-keystream 45 and only affects the dynamic FSR structures (120 and 130) and not the static FSR structure (110).

Figure 3:
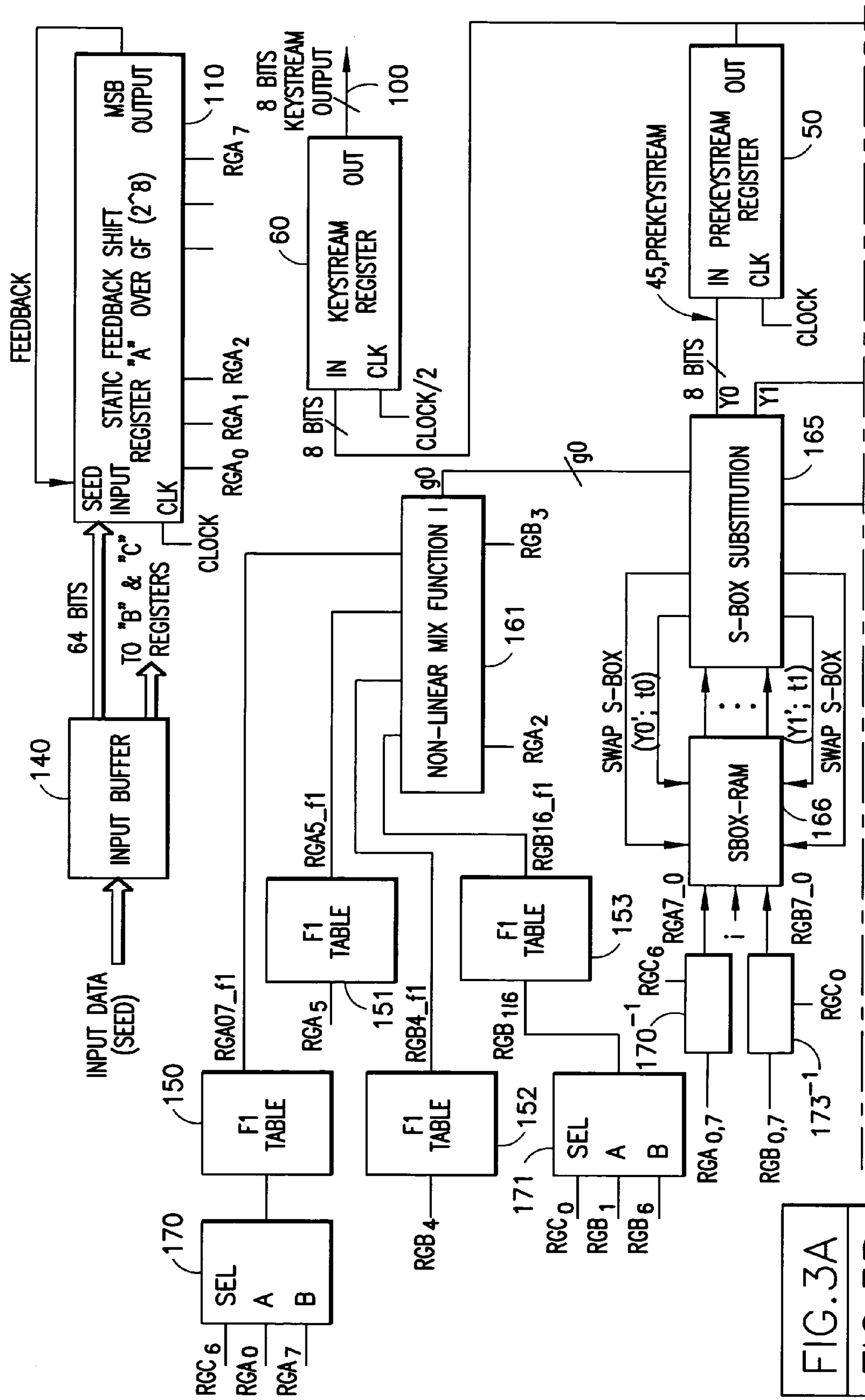
FIG. 3 shows an alternate illustrative embodiment of the present invention.
Figure 3B:
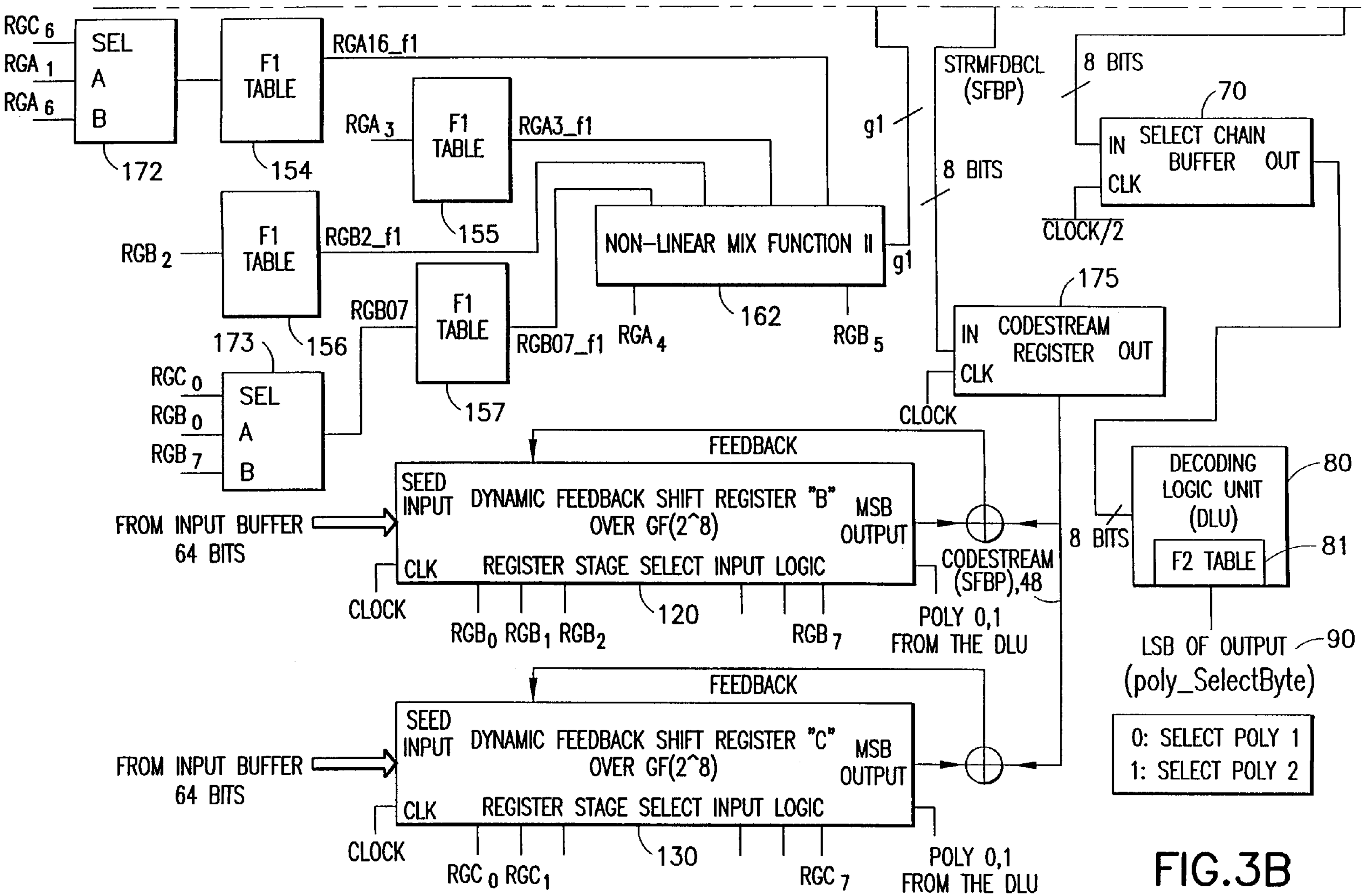

FIG. 3 illustrates a specific configuration of the FIG. 2 embodiment of the invention where the polynomials used for the FSRs are constructed over extended Galois Field GF(2^8), and all polynomials are selected to be primitive and irreducible in order to generate a maximum length sequence. The degree of these polynomials is 8 so there will be 8 stages of 8-tuple shift register cells used in each FSR. Since the sparseness of the terms for the polynomial can be a source of cryptographic weakness, dense primitive polynomials with many coefficients are used. The output from each stage of each FSR may have 8 bits (one byte).

The three FSRs 110, 120, and 130 require 192 total bits (18 bytes) of information to initialize them. These 192 bits are drawn from 128 bits of input, with half the 128 bits duplicated to provide 192 bits of input to input buffer 140. Input buffer 140 provides 64 bits of input to each FSR 110, 120, and 130.

As shown in the table below, a 128 bit (16 byte) input is used to initialize 192 bits (18 bytes) of FSR state. The input bytes are numbered from 0 to 15, and are used to initialize the three FSRs A, B, and C.

TABLE 1

Mapping Input to FSRs A, B, and C

| | FSR Bytes That Are Initialized Using this Byte | | | |
|---|---|---|---|---|
| Input Byte | FSR | Byte | FSR | Byte |
| 0 | B | 0 | A | 0 |
| 1 | B | 1 | A | 1 |
| 2 | B | 2 | A | 2 |
| 3 | B | 3 | A | 3 |
| 4 | B | 4 | | |
| 5 | B | 5 | | |
| 6 | B | 6 | | |
| 7 | B | 7 | | |
| 8 | C | 0 | A | 4 |
| 9 | C | 1 | A | 5 |
| 10 | C | 2 | A | 6 |
| 11 | C | 3 | A | 7 |
| 12 | C | 4 | | |
| 13 | C | 5 | | |
| 14 | C | 6 | | |
| 15 | C | 7 | | |

A 128 bit input data seed is stored in the input buffer 140. All of the bits of the input seed are loaded in parallel from the input buffer into dynamic FSR structures B and C. The other third of the input (bytes 0–3 and 8–11) is loaded in parallel into the static FSR structure A.

As each FSR constructed in the extended Galois Field GF(2^8) has 8 stages, input data for each stage should be 64 bits in size (since the actual input size is 128 bits, the above processing step is needed to reduce the information from 192 to 128 bits in size.)

As discussed above in connection with FIG. 2, each pre-keystream byte 45 is generated from a combination of a three-stage non-linear function process. In the first randomization stage, certain predetermined data bytes shifted from two separate feedback shift registers (A and B) are permutated by the F1 tables 150–157. In the second randomization stage, non-linear functions 161, 162 are used to mix data bytes from different F1 tables as well as data bytes directly from predetermined stages of registers A and B. In a third randomization stage, an 8*8 S-box 165 (initialized to $S_0=0$, $S_1=1, \ldots S_{255}=255$) is used to permute the outputs from the second-level non-linear function, along with 2 bytes of data from registers A and B.

Figure 4:
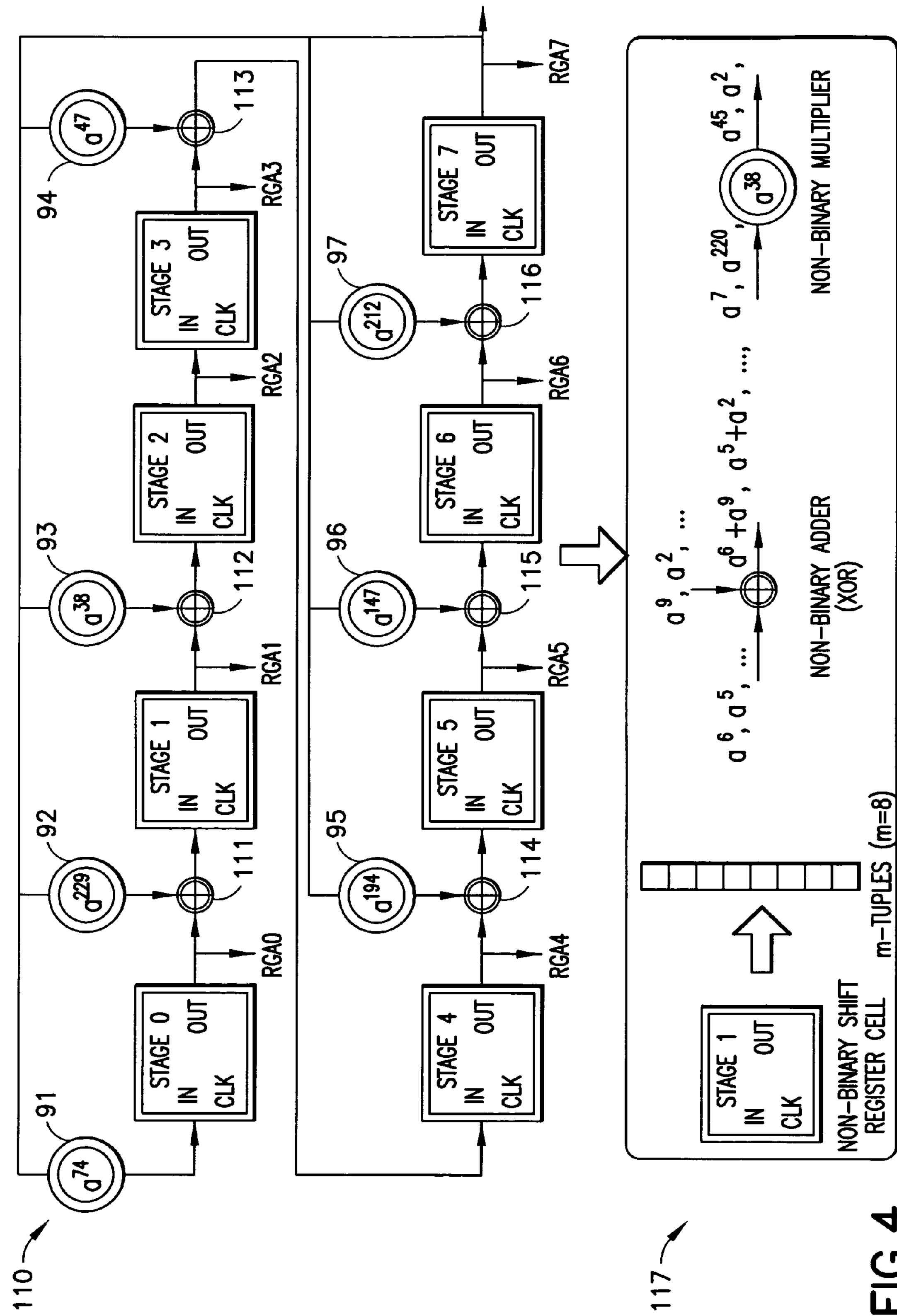
FIG. 4 shows an implementation of a static feedback shift register in accordance with the present invention.
Figure 5:
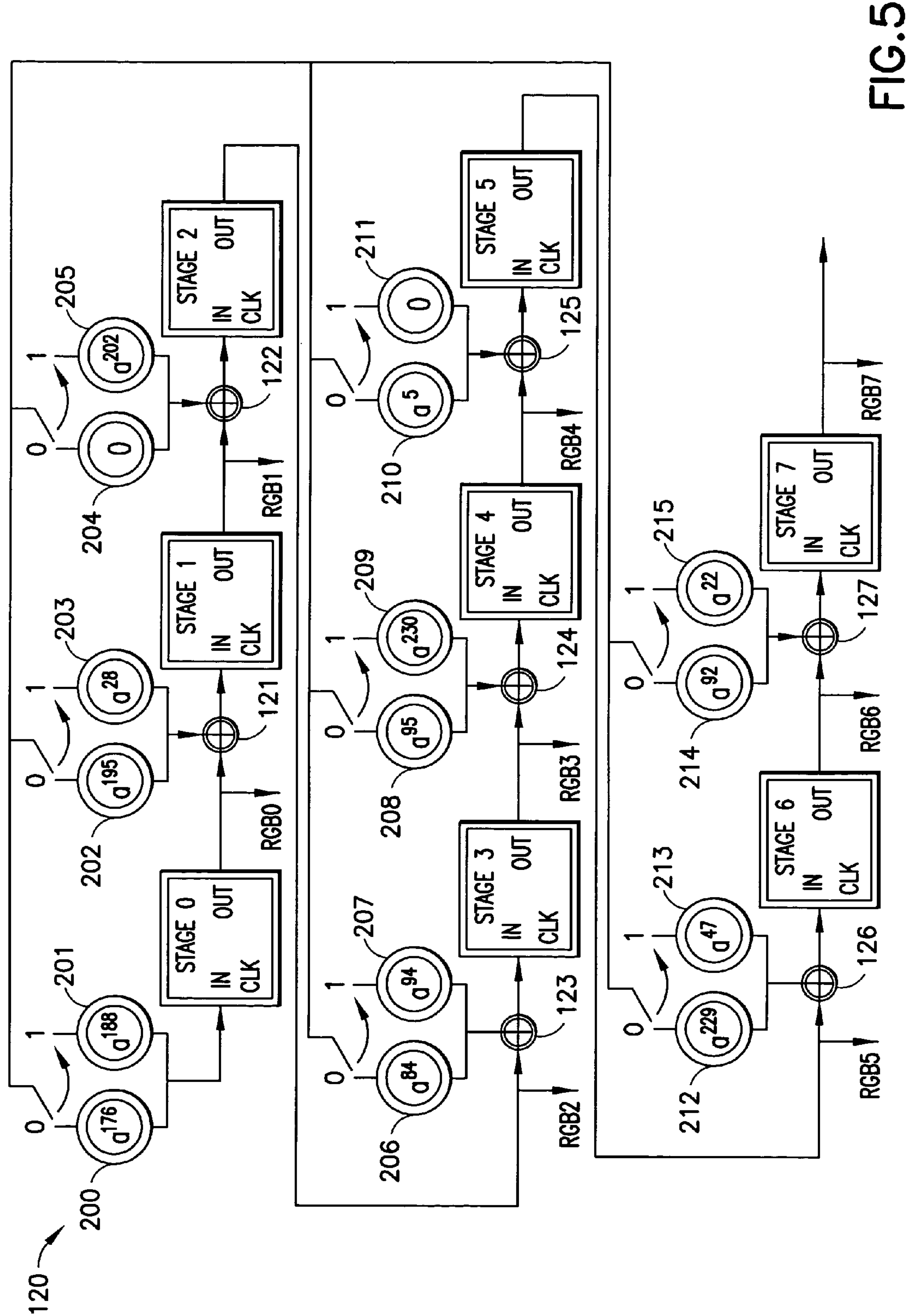
FIG. 5 shows an implementation of a dynamic feedback shift register in accordance with the present invention.
Figure 6:
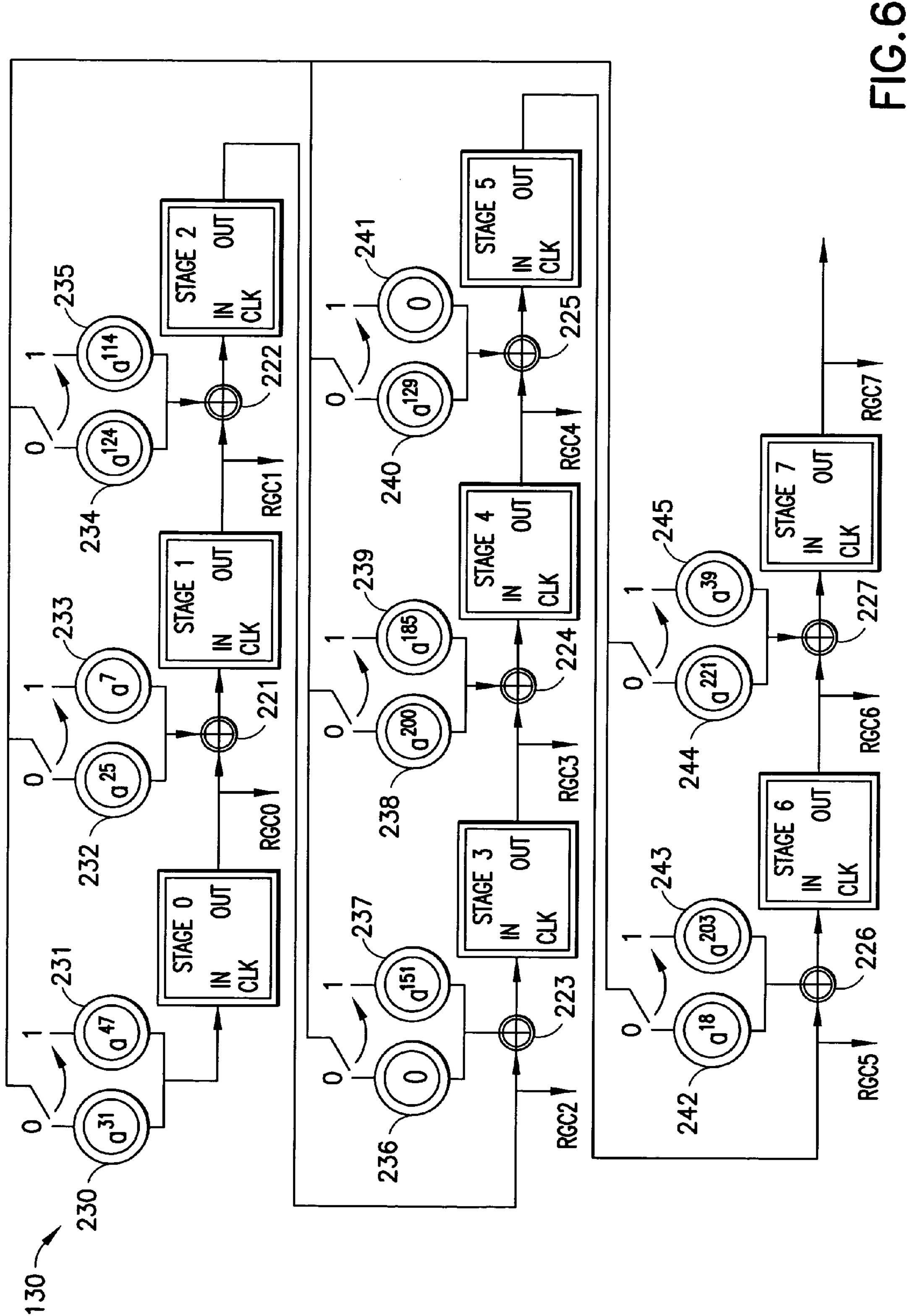
FIG. 6 shows a further implementation of a dynamic feedback shift register in accordance with the present invention.

Static FSR structure 110 (register A) and two dynamic FSR structures 120 and 130 (registers B and C) are shown in FIG. 4, FIG. 5, and FIG. 6 respectively. Each of these structures includes L stages, where L=8, with stage 0 being the input stage, stage 7 being the output stage, and stage 1 through 6 being the intermediate stages. All the polynomials used in the explanations herein are selected for illustration purposes. It should be appreciated that various other polynomials may be used to implement the invention.

All the FSRs are constructed over the extended Galois Field, GF ($2^8$). The elements in GF($2^8$) are generated by:

$$F(X)=X^8+X^4+X^3+X^2+1=[1\ 0\ 0\ 0\ 1\ 1\ 1\ 0\ 1]$$

Where X is a primitive element of GF($2^8$). Addition and multiplication operations within GF($2^8$) are also illustrated in FIG. 4 at 117.

In the static feedback register 110 (structure A) shown in FIG. 4, data bits are shifted serially from each stage in response to a clock signal applied to the CLK terminal. Data bytes shifted from the register stages are provided respectively at the output terminals $RGA_0$ through $RGA_7$. A number of finite field adders 111–116 are respectively located between predetermined pairs of register stages. In FIG. 4, finite field adders are located between Stage 0 and stage 1 (111), Stage 1 and Stage 2 (112), Stage 3 and Stage 4 (113), Stage 4 and Stage 5 (114), Stage 5 and Stage 6 (115), and Stage 6 and Stage 7 (116). No finite field adder is located between Stages 2 and 3. One of the inputs to each adder 111–116 is provided from the preceding register stage and the other input to each adder is fed back from output terminal $RGA_7$ of the eighth output stage via finite field multipliers 91–97 respectively.

The function of a non-binary adder (XOR) and a non-binary multiplier at is shown generally at 117.

The structure of register A has a fixed, non- dynamic polynomial code and coefficients. The polynomial code of the static FSR structure of register A is not varied in response to the polynomial code signal. As shown in FIG. 4 the polynomial used for A register is:

Register Structure $Poly\_A=x^8\oplus\alpha^{212}x^7\oplus\alpha^{147}x^6\oplus\alpha^{194}x^5\oplus\alpha^{47}x^4\oplus 0x^3\oplus\alpha^{38}x^2\oplus\alpha^{229}x\oplus\alpha^{74}$, where $\alpha(X)=\alpha X$ to obtain the 8-tuple $j_7X^7+j_6X^6+j_5X^5+j_4X^4+j_3X^3+j_2X^2+j_1X+j_0$. The values for the individual coefficient multipliers are as follows:

$\alpha^{212}=\alpha^6+\alpha^5+\alpha^4+\alpha^3+1=$[0 1 1 1 1 0 0 1]

$\alpha^{147}=\alpha^5+\alpha^3+1=$[0 0 1 0 1 0 0 1]

$\alpha^{194}=\alpha^5+\alpha^4+\alpha=$[0 0 1 1 0 0 1 0]

$\alpha^{47}=\alpha^5+\alpha^2=$[0 0 1 0 0 1 0 0]

$\alpha^{38}=\alpha^7+\alpha^4+\alpha^2=$[1 0 0 1 0 1 0 0]

$\alpha^{229}=\alpha^6+\alpha^5+\alpha^4+\alpha^3+\alpha=$[0 1 1 1 1 0 1 0]

$\alpha^{74}=\alpha^7+\alpha^3+1$[1 0 0 0 1 0 0 1]

In the dynamic feedback shift register structures B and C (120 and 130), as shown in FIGS. 5 and 6 respectively, data bits are shifted serially in response to a clock signal, and they are also shifted in accordance with a polynomial code signal 90 connected from the output stage into the input stage. As discussed in connection with FIG. 4, a number of logic elements are respectively located between predetermined pairs of register stages of registers B and C. The logic elements process a data bit shifted from the preceding stage with the data bit feedback from the output stage, also in accordance with a polynomial code signal 90.

In the B-register and C-register structures, a polynomial code signal from the decoding logic unit is applied to select one set of polynomial coefficients (i.e. a different set of extended Galois Field multiplier values) from two sets of polynomial coefficients.

For example, in the dynamic feedback register structure B shown in FIG. 5, data bits are shifted serially from each stage in response to a clock signal applied to the CLK terminal. Data bytes shifted from the register stages are provided respectively at the output terminals $RGB_0$ through $RGB_7$. A number of finite field adders 121–127 are respectively located between each pair of register stages. One of the inputs to each adder 121–127 is provided from the preceding register stage and the other input to each adder is fed back from output terminal $RGB_7$ of the eighth output stage via one of two sets of finite field multipliers (e.g., one set includes finite field multipliers 200, 202, 204, 205, 206, 208, 210, 212, and 214; the second set includes 201, 203, 205, 207, 209, 211, 213, and 215). Which set of finite field multipliers is used depends on the polynomial selected in response to the polynomial code 90 (from the decoding logic unit 80 of FIG. 3).

The structure of dynamic feedback shift register B shown in FIG. 5 uses only two polynomials. The least significant bit (lsb) of Decoding Logic Unit 80 output is used to select one of the following polynomials from the dynamic FSR structure B:

$Poly\_B0=x^8\oplus\alpha^{92}x^7\oplus\alpha^{229}x^6\oplus\alpha^5x^5\oplus\alpha^{95}x^4\oplus\alpha^{84}x^3\oplus 0x\hat{2}\oplus\alpha^{195}x\oplus\alpha^{176}$, where $\alpha(X)=\alpha=X$ to obtain the 8-tuple $j_7X^7+j_6X^6+j_5X^5+j_4X^4+j_3X^3+j_2X^2+j_1X+j_0$. The values for the individual coefficient multipliers follows:

$\alpha^{92}=\alpha^6+\alpha^4+\alpha^3+\alpha+1$ [0 1 0 1 1 0 1 1]

$\alpha^{229}=\alpha^6+\alpha^5+\alpha^4+\alpha^3+\alpha=$[0 1 1 1 1 1 0 1 0]

$\alpha^5=\alpha^5=$[0 0 1 0 0 0 0 0]

$\alpha^{95}=\alpha^7+\alpha^6+\alpha^5+\alpha=$[1 1 1 0 0 0 1 0]

$\alpha^{84}=\alpha^6+\alpha^5+\alpha^3+\alpha+1$[0 1 1 0 1 0 1 1]

$\alpha^{195}=\alpha^6+\alpha^5+\alpha^3+\alpha+1=$[0 1 1 0 0 1 0 0]

$\alpha^{176}=\alpha^7+\alpha^6+\alpha^5+\alpha+1=$[1 1 1 0 0 0 1 1]

The second polynomial used in the structure B is:

$Poly\_B1=x^8\oplus\alpha^{22}x^7\oplus\alpha^{47}x^6\oplus 0x^5\oplus\alpha^{230}x^4\oplus\alpha^{94}x^3\oplus\alpha^{202}x^2\oplus\alpha^{28}x\oplus\alpha^{188}$.

The values for the individual coefficient multipliers are as follows:

$\alpha^{22}=\alpha^7+\alpha^6+\alpha^5+\alpha^3+\alpha=$[1 1 1 0 1 0 1 0]

$\alpha^{47}=\alpha^5+\alpha+1=$[0 0 1 0 0 0 1 1]

$\alpha^{230}=\alpha^7+\alpha^6+\alpha^5+{}^4+\alpha^2=$[1 1 1 1 0 1 0 0]

$\alpha^{94}=\alpha^6+\alpha^5+\alpha^4+1=$[0 1 1 1 0 0 0 1]

$\alpha^{202}=\alpha^5+\alpha^4+\alpha^3=$[0 1 1 1 0 0 0 0]

$\alpha^{28}=\alpha^4+\alpha^3=$[0 0 0 1 1 0 0 0]

$\alpha^{188}=\alpha^7+\alpha^5+\alpha^2+1=$[1 0 1 0 0 1 0 1]

The structure of dynamic feedback shift register C (130) is shown in FIG. 6. The function of register C corresponds to that of register B shown in FIG. 5, with finite field adders 221–227 of register C equivalent to the finite field adders 121–127 of register B of FIG. 5 and finite field multipliers 230–245 of register C equivalent to finite field multipliers 200–215 of register B of FIG. 5.

In this example implementation, there are also only two polynomials used in the structure of register C. The least significant bit (lsb) of Decoding Logic Unit 80 output is used to select one out of two polynomials from the dynamic FSR structure C:

$Poly\_C0=x^8\oplus\alpha^{221}x^7\oplus\alpha^{18}x^6\oplus\alpha^{129}x^5\oplus\alpha^{200}x^4\oplus 0x^3\oplus\alpha^{124}x^2\oplus\alpha\oplus\alpha^{25}x\oplus\alpha^{31}$, where $\alpha(X)=\alpha X$ to obtain the 8-tuple $j_7X^7+j_6X^6+j_5X^5+j_4X^4+j_3X^3+j_2X^2+j_1X+j_0$. The values for the individual coefficient multipliers are as follows:

$\alpha^{221}=\alpha^6+\alpha^2+1=$[0 1 0 0 0 1 0 1]

$\alpha^{18}=\alpha^5+\alpha^3+\alpha^2+1=$[0 0 1 0 1 1 0 1]

$\alpha^{129}=\alpha^4+\alpha^2+\alpha 1=$[0 0 0 1 0 1 1 1]

$\alpha^{200}=\alpha^4+\alpha^3+\alpha^2=$[0 0 0 1 1 1 0 0]

$\alpha^{124}=\alpha^7+\alpha^4+\alpha^2+\alpha+1=$[1 0 0 1 0 1 1 1]

$\alpha^{25}=\alpha+1=$[0 0 0 0 0 0 1 1]

$\alpha^{31}=\alpha^7+\alpha^6=$[1 1 0 0 0 0 0 0]

The second polynomial used in the structure of register C is:

$Poly\_C1=x^8\oplus\alpha^{39}x^7\oplus\alpha^{203}x^6\oplus 0x^5\oplus\alpha^{185}x^4\oplus x^4\oplus\alpha^{151}x^3\oplus\alpha\oplus 114\ x\oplus\alpha^{47}$ The following values for the individual coefficient multipliers are as follows:

$\alpha$^39=$\alpha$^5+$\alpha$^4+$\alpha$^2+1=[0 0 1 1 0 1 0 1]
$\alpha$^203=$\alpha$^7+$\alpha$^6+$\alpha$^5=[1 1 1 0 0 0 0 0]
$\alpha$^185=$\alpha$^5+$\alpha$^4+$\alpha$^2+$\alpha$+1=[0 0 1 1 0 1 1 1]
$\alpha$^151=$\alpha$^7+$\alpha$^5+$\alpha$^3+$\alpha$+1=[1 0 1 0 1 0 1 0]
$\alpha$^114=$\alpha$^5+$\alpha$^4+$\alpha$^3+$\alpha$^2+$\alpha$=[0 0 1 1 1 1 1 0]
$\alpha$^7=$\alpha$^7=[1 0 0 0 0 0 0 0]
$\alpha$^47=$\alpha$^5+$\alpha$+1=[0 0 1 0 0 0 1 1]

Referring back to FIG. 3, the polynomial code signal 90 that is applied in the dynamic FSRs 120 and 130 varies in accordance with data bits shifted from a predetermined register stage. An F2 table 81 is used in the Decoding Logic Unit (DLU) 80 to generate the polynomial code signal.

The decoding logic unit 80 of FIG. 3 uses the least significant bit (lsb) of F2 table output to select one of two polynomials from the dynamic FSRs 120, 130. In this case, 2 different polynomials are used in the B-register structure and C-register structure, and one polynomial is used in the A-register structure. Therefore, only one bit in every other pre- keystream byte after F2 table substitution is used directly to select between the two polynomials, POLY__AO (POLY__BO) and POLY__A1(POLY__B1).

Alternate bytes (8 bits) from the pre-keystream 45 are processed to vary the polynomial code signal 90, and the remaining bytes of the pre-keystream 45 are processed to provide the keystream 100. The bytes that cause the polynomial code signal 90 to be varied are not included in the keystream 100.

As discussed above in connection with FIG. 2, in the embodiment described in FIG. 3, the multiplexers 170–173 use the output from predetermined register stages of register C to select between data bytes shifted from different predetermined register stages of registers A and B to provide some of the inputs to the F1 tables (e.g., F1 tables 150, 153, 154, and 157). Each multiplexer 170-173 is a 2:1 multiplexer. For example, two output bits ($RGA_0$ and $RGA_7$) are shifted directly from different stages of register A to multiplexer 170. One of $RGA_0$ and $RGA_7$ is selected by multiplexer 170 in response to a data bit shifted from register C ($RGC_6$). Similar operations take place at multiplexers 171, 172, and 173. The output of multiplexers 170, 171, 172, and 173 is provided to $F_1$ tables 150, 153, 154, and 157 respectively.

Detailed multiplexer settings for multiplexers (MUX) 170 and 172 are shown in the table below.

TABLE 2

MUX 170 and 172 Settings

| | SEL | A | B | Descriptions |
|---|---|---|---|---|
| MUX 170 | $RGC_6$ | $RGA_0$ | $RGA_7$ | $Output_i$ = $RGA_{0\_i}$ if $RGC_{6\_i}$ = 0<br>Or = $RGA_{7\_i}$ if $RGC_{6\_i}$ = 1<br>Where i = 0, 1, . . . , 7 |
| MUX 172 | $RGC_6$ | $RGA_1$ | $RGA_6$ | $Output_i$ = $RGA_{1\_i}$ if $RGC_{7\_i}$ = 0<br>Or = $RGA_{6\_i}$ if $RGC_{7\_i}$ = 1<br>Where i = 0, 1, . . . , 7 |

Detailed multiplexer settings for multiplexers (MUX) 171 and 173 are shown in the table below.

TABLE 3

MUX 171 and 173 Settings

| | SEL | A | B | Descriptions |
|---|---|---|---|---|
| MUX 171 | $RGC_0$ | $RGB_1$ | $RGB_6$ | $Output_i$ = $RGA_{1\_i}$ if $RGC_{6\_i}$ = 0<br>Or = $RGA_{6\_i}$ if $RGC_{6\_i}$ = 1<br>Where i = 0, 1, . . . , 7 |

TABLE 3-continued

MUX 171 and 173 Settings

| | SEL | A | B | Descriptions |
|---|---|---|---|---|
| MUX 173 | $RGC_0$ | $RGB_0$ | $RGB_7$ | $Output_i$ = $RGA_{0\_i}$ if $RGC_{7\_i}$ = 0<br>Or = $RGA_{7\_i}$ if $RGC_{7\_i}$ = 1<br>Where i = 0, 1, . . . , 7 |

Multiplexers may also be used to provide the address signal to the S-Box substitution function 165. For example, the inverse of MUX 170 (MUX $\mathbf{170^{-1}}$) is used to select alternate bits from $RGA_0$ and $RGA_7$. MUX $\mathbf{170^{-1}}$ is defined in the following table:

TABLE 4

MUX $170^{-1}$ Settings

| | SEL | A | B | Descriptions |
|---|---|---|---|---|
| MUX $170^{-1}$ | $RGC_6$ | $RGA_7$ | $RGA_0$ | $Output_i$ = $RGA_{7\_i}$ if $RGC_{6\_i}$ = 0<br>Or = $RGA_{0\_i}$ if $RGC_{6\_i}$ = 1<br>Where i = 0, 1, . . . , 7 |

The inverse of MUX 173 (MUX $\mathbf{173^{-1}}$) is used to select alternate bits from $RGB_0$ and $RGB_7$. MUX $\mathbf{173^{-1}}$ is defined in the following table:

TABLE 5

MUX $173^{-1}$ Settings

| | SEL | A | B | Descriptions |
|---|---|---|---|---|
| MUX $173^{-1}$ | $RGC_0$ | $RGB_7$ | $RGB_0$ | $Output_i$ = $RGA_{7\_i}$ if $RGC_{6\_i}$ = 0<br>Or = $RGA_{0\_i}$ if $RGC_{6\_i}$ = 1<br>Where i = 0, 1, . . . , 7 |

Two of eight register outputs from each shift register are tapped as direct inputs to the F1 tables 151, 152, 155, 156. No tap is used more than once. Input to the remaining F1 tables 150, 153, 154, and 157 are from the multiplexers 170, 171, 172, and 173 respectively.

The non-linear mix functions 161, 162 used to combine two bytes shifted directly from the register A or register B ($RGA_2$/$RGA_4$, $RGB_3$/$RGB_5$) with others that are from the F1 tables:

$$g\mathbf{0}=RGA'_{0|7}RGB'_{1|6}\oplus RGA_2RGB'_4\oplus RGA'_5RGB_3$$

$$g\mathbf{1}=RGA'_{1|6}RGB'_{0|7}\oplus RGA_4RGB'_2\oplus RGA'_3RGB_5$$

The $RGA'_{0|7}$ is a field element constructed from selecting 8 bits from $RGA_0$ and $RGA_7$ based on $RGC_6$, and then passing the selected bits to the F1 table 150. By the same definition, $RGB'_{1|6}$ is a field element constructed from selecting 8 bits from $RGB_1$ and $RGB_6$ based on $RGC_0$, and then passing the selected bits to the F1 table 153. The $RGA'_{1|6}$ is a field element constructed from selecting 8 bits from $RGA_1$ and $RGA_6$ based on $RGC_6$, and then passing the selected bits to the F1 table 172. $RGB'_{0|7}$ is a field element constructed from selecting 8 bits from $RGB_0$ and $RGB_7$ based on $RGC_0$, and then passing the selected bits to the F1 table 157. The two non-linear functions g0 and g1 set forth above are constructed in accordance with the following rules:

Terms multiplied together shall be from different register structures.

At least one of two multiplication terms shall be from the F1 tables.

Referring to FIG. 3, the 8*8 S-Box 165 is used to provide individual pre-keystream bytes 45 and codestream bytes 48 respectively from output terminal Y1 and Y0 in accordance with the contents of the output from the non-linear mix functions 161, 162 and two bytes of data from the A and B register structures. The entries of the S-Box are a permutation of the numbers 0 through 255, and the address of the S-Box is a function of loop counter n, g0, g1, $RGB_{0|7}$, and $RGA_{0|7}$.

The S-box is initialized linearly to $S_0=0$, $S_1=1$, . . . , $S_{255}=255$. The S-box permutation process can be formulated in accordance with the following relationships:

n from 0 to runup__Cycles $n=(n \% 256)$;

$Y0'=(g0+S_{RGB0|7}+S_n) \bmod 256$ swap $S_i$ and $S_{Y0'}$ $Y1'=(g1+S\ S_{RGA0|7}+S_n) \bmod 256$ swap $S_i$ and $S_{Y1'}$ $t0=(S_{g1}+S_{Y0'}) \bmod 256$ $t1=(S_{g0}+S_{Y1'}) \bmod 256$ $Y0=S_{t0}$ and $Y1=S_{t1}$ The S-Box slowly evolves with the iterations of n to ensure that every element changes, and also with the use of (g0, g1, $RGB_{0|7}$, $RGA_{0|7}$, Y0", Y1") to ensure that the elements change randomly.

The Codestream Register 175 receives codestream bits 48 from the Y1 output terminal of the S-Box 165 in response to the address signal from the A and B structures, and also from the non-linear mix functions 161, 162. The codestream bytes 48 are clocked through the Codestream Register 175, and added by a non-binary adder (XOR) to the data bytes ($RGB_7$, $RGC_7$) shifted from the MSB output stage (stage 7) of register B and register C. This process provides a feedback data byte, which is then fed back both to the input stage (stage 0) and to predetermined intermediate stages of registers B and C in accordance with the applied polynomial code 90.

Keystream bytes 100 from the Keystream Register 60 are produced based on the control clock, CLOCK. These bytes are assembled to form the 7 bytes or 56 bits of output only after the algorithm has had adequate mixing time to circulate data among the FSRs. The amount of mixing time is measured in the number of clock cycles of CLOCK between the time FSRs A, B, and C are initialized, and the time that the Keystream Register 60 byte output is stored. The initialization takes place at time T=0, where time is measured in CLOCK cycles. After initialization, 701 CLOCK cycles may occur before the first byte of Keystream Register 60 output is stored. Thereafter, output bytes may be stored after the completion of the following additional cycles:

TABLE 6

CLOCK Cycles from Initialization to Output Storage

| CLOCK Cycle Number | Event | CLOCK Cycle Number | Event |
|---|---|---|---|
| 0 | Initialize FSR A, B, and C | 701 + 126 = 827 | Store output byte 3 |
| 701 | Store output byte 0 | 701 + 142 = 843 | Store output byte 4 |
| 701 + 30 = 731 | Store output byte 1 | 701 + 580 = 1281 | Store output byte 5 |
| 701 + 70 = 771 | Store output byte 2 | 701 + 636 = 1337 | Store output byte 6 |

The embodiments of the invention described above are selected preferred embodiments and are not intended to provide a limitation on the scope of the invention. It should be appreciated that many variations of the implementations described above are available. For example, the invention described herein can be implemented using a wide variety of input key sizes. In addition, various Galois field selections may be used to implement the invention. The number of static and/or dynamic feedback shift registers used may vary, as well as the number of register stages for each such shift register. The number of randomization stages may vary, as well as the functionality contained within each stage (e.g., number of multiplexers, number of S-Boxes, number of randomization tables, and the like). Other implementation complexities can be varied or changed consistent with the general description of the invention described above.

It should now be appreciated that the present invention provides improved methods and apparatus for generating a cryptographically robust keystream for use in data encryption and decryption.

Although the invention has been described in connection with various illustrated embodiments, numerous modifications and adaptations may be made thereto without departing from the spirit and scope of the invention as set forth in the claims.

What is claimed is:

1. A method of generating a keystream, comprising the steps of:

providing data bits from predetermined register stages of multiple feedback shift registers to a first randomization stage, each feedback shift register having input, intermediate, and output stages through which the data bits are shifted serially in response to a clock signal;

providing output of said first randomization stage to a second randomization stage;

providing output of said second randomization stage and data bits from other predetermined register stages of said feedback shift registers to at least one additional randomization stage, wherein, said data bits are permutated at each randomization stage and output of a final randomization stage provides said keystream;

wherein the feedback shift registers comprise:

a plurality of dynamic feedback shift registers: and at least one static feedback shift register.

2. A method in accordance with claim 1, wherein a third randomization stage is the final randomization stage.

3. A method in accordance with claim 1, further comprising the step of:

varying at least one feedback shift register structure in response to a polynomial code signal generated by a polynomial code signal generator.

4. A method in accordance with claim 3, further comprising the step of:

varying the polynomial code used to generate the polynomial code signal.

5. A method in accordance with claim 1, wherein the feedback shift registers comprise:

a first dynamic feedback shift register;

a second dynamic feedback shift register; and a static feedback shift register.

6. A method in accordance with claim 5, further comprising the steps of:

inputting seed data into an input buffer;

providing a first portion of the seed data from the input buffer to the first dynamic feedback shift register;

providing a second portion of the seed data from the input buffer to the second dynamic feedback shift register; and providing a third portion of the seed data from the input buffer to the static feedback shift register.

7. A method in accordance with claim 6, wherein:

the data bits of the dynamic feedback shift registers are shifted serially from each register stage in response to a clock signal;

a number of finite field adders are arranged between predetermined pairs of the register stages of the dynamic feedback shift registers, such that one of the inputs to each adder is provided from the preceding register stage and the other input of each adder is fed back from the output terminal of the output stage via a finite field multiplier.

8. A method in accordance with claim 1, wherein the first randomization stage comprises a randomization table for permuting data bits from predetermined register stages.

9. A method in accordance with claim 1, wherein the second randomization stage comprises a non-linear mixing function to combine the output of said second randomization stage and data bits from other predetermined register stages of said feedback shift registers.

10. A method in accordance with claim 1, wherein the final randomization stage comprises multiple non-linear S-Boxes.

11. A method in accordance with claim 10, wherein the S-Boxes are 8*8 S-Boxes.

12. A method in accordance with claim 1, wherein the final randomization stage comprises 256 non-linear 8*8 S-Boxes.

13. A method in accordance with claim 1, wherein the feedback shift registers are constructed using an extended Galois field ($GF(2^m)$).

14. A method in accordance with claim 13, wherein m equals eight.

15. A method in accordance with claim 13, wherein the polynomials used for the feedback shift registers are primitive and irreducible.

16. A method in accordance with claim 1, wherein the first randomization stage comprises multiple randomization tables for permuting data bits from predetermined register stages.

17. A method in accordance with claim 16, wherein the multiple randomization tables comprise eight randomization tables.

18. A method in accordance with claim 1, further comprising the step of:

multiplexing the data bits from the feedback shift registers prior to input into the first randomization stage.

19. A method in accordance with claim 1, further comprising the steps of:

providing the output from the final randomization stage to a pre-keystream register;

providing alternate bits of the output from said pre-keystream register to a select chain buffer;

providing output from the select chain buffer to a decoding logic unit, which decoding logic unit decodes a particular polynomial for use in generating a polynomial code signal, said polynomial code signal being provided to at least one feedback shift register; and providing the remaining bits of the output from said pre-keystream register to a keystream register, wherein the output of the keystream register provides said keystream.

20. A method in accordance with claim 19, wherein the final randomization stage comprises multiple non-linear S-Boxes.

21. A method in accordance with claim 20, further comprising the steps of:

providing certain output of the S-Boxes to a codestream register;

clocking said output through said codestream register;

adding said output to data bits shifted from at least one of the feedback shift registers via a non-binary adder to produce feedback data bits;

providing the feedback data bits to the input stage and predetermined intermediate stages of at least one of the feedback shift registers.

22. A method in accordance with claim 1, wherein:

a 192 bit shared seed input key is provided to the multiple feedback shift registers; and a 56 bit keystream output is generated.

23. A method in accordance with claim 22, wherein the 192 bit shared seed input key is derived from a 128 bit input by duplicating half the bits.

24. A keystream generator apparatus, comprising:

multiple feedback shift registers, each feedback shift register having input, intermediate, and output stages through which data bits are shifted serially in response to a clock signal;

a first randomization stage which receives output from predetermined register stages of the multiple feedback shift registers;

a second randomization stage which receives output from said first randomization stage;

a third randomization stage which receives output from said second randomization stage and data bits from other predetermined register stages of said feedback shift registers, wherein, said data bits are permutated at each randomization stage and output of a final randomization stage provides said keystream;

wherein the feedback shift resisters comprise:

a plurality of dynamic feedback shift registers and at least one static feedback shift register.

25. Apparatus in accordance with claim 24, wherein the third randomization stage is the final randomization stage.

26. Apparatus in accordance with claim 24, wherein:

at least one feedback shift register structure is varied in response to a polynomial code signal generated by a polynomial code signal generator.

27. Apparatus in accordance with claim 26, wherein:

the polynomial code used to generate the polynomial code signal is varied.

28. Apparatus in accordance with claim 24, wherein the feedback shift registers comprise:

a first dynamic feedback shift register;

a second dynamic feedback shift register; and a static feedback shift register.

29. Apparatus in accordance with claim 28, wherein:

seed data is input into an input buffer;

a first portion of the seed data from the input buffer is provided to the first dynamic feedback shift register;

a second portion of the seed data from the input buffer is provided to the second dynamic feedback shift register; and a third portion of the seed data from the input buffer is provided to the static feedback shift register.

30. Apparatus in accordance with claim 29, wherein:

the data bits of the dynamic feedback shift registers are shifted serially from each register stage in response to a clock signal;

a number of finite field adders are arranged between predetermined pairs of the register stages of the dynamic feedback shift registers, such that one of the inputs to each adder is provided from the preceding register stage and the other input of each adder is fed back from the output terminal of the output stage via a finite field multiplier.

31. Apparatus in accordance with claim 24, wherein the first randomization stage comprises a randomization table for permuting data bits from predetermined register stages.

32. Apparatus in accordance with claim 24, wherein the second randomization stage comprises a non-linear mixing function to combine the output of said second randomization stage and data bits from other predetermined register stages of said feedback shift registers.

33. Apparatus in accordance with claim 24, wherein the third randomization stage comprises multiple non-linear S-Boxes.

34. Apparatus in accordance with claim 33, wherein the S-Boxes are 8*8 S-Boxes.

35. Apparatus in accordance with claim 24, wherein the third randomization stage comprises 256 non-linear 8*8 S-Boxes.

36. Apparatus in accordance with claim 24, wherein the feedback shift registers are constructed using an extended Galois field ($GF(2^m)$).

37. Apparatus in accordance with claim 36, wherein m equals eight.

38. Apparatus in accordance with claim 36, wherein the polynomials used for the feedback shift registers are primitive and irreducible.

39. Apparatus in accordance with claim 24, wherein the first randomization stage comprises multiple randomization tables for permuting data bits from predetermined register stages.

40. Apparatus in accordance with claim 39, wherein the multiple randomization tables comprise eight randomization tables.

41. Apparatus in accordance with claim 24, wherein:

the data bits from the feedback shift registers are multiplexed prior to input into the first randomization stage.

42. Apparatus in accordance with claim 24, further comprising:

a pre-keystream register for receiving the output from the third randomization stage;

a select chain buffer for receiving alternate bits of the output from said pre-keystream register;

a decoding logic unit for receiving output from the select chain buffer, which decoding logic unit decodes a particular polynomial for use in generating a polynomial code signal, said polynomial code signal being provided to at least one feedback shift register; and a keystream register for receiving the remaining bits of the output from said pre- keystream register, wherein output of the keystream register provides said keystream.

43. Apparatus in accordance with claim 42, wherein the third randomization stage comprises multiple non-linear S-Boxes.

44. Apparatus in accordance with claim 43, wherein:

certain output of the S-Boxes is provided to a codestream register;

said output is clocked through said codestream register;

said output is added to data bits shifted from at least one of the feedback shift registers via a non-binary adder to produce feedback data bits; and said feedback data bits are provided to the input stage and predetermined intermediate stages of at least one of the feedback shift registers.

45. Apparatus in accordance with claim 24, wherein:

a 192 bit shared seed input key is provided to the multiple feedback shift registers; and a 56 bit keystream output is generated.

46. Apparatus in accordance with claim 45, wherein the 192 bit shared seed input key is derived from a 128 bit input by duplicating half the bits.

* * * * *